(12) United States Patent
Mall et al.

(10) Patent No.: US 7,194,894 B2
(45) Date of Patent: Mar. 27, 2007

(54) ADVANCED HIT SKID DATA COLLECTION

(75) Inventors: Waheed Tony Mall, Waterford, NY (US); Roderick Mark Lusted, Niskayuna, NY (US); Gary Lindsey Stewart, Monroeville, PA (US); Scott A Wheeler, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 120 days.

(21) Appl. No.: 10/980,796

(22) Filed: Nov. 4, 2004

(65) Prior Publication Data

US 2006/0090545 A1 May 4, 2006

(51) Int. Cl.
*G01M 3/04* (2006.01)
(52) U.S. Cl. .................................. 73/40.5 R
(58) Field of Classification Search ............... 73/40, 73/40.5 R, 49.7; 702/51
See application file for complete search history.

(56) References Cited

U.S. PATENT DOCUMENTS

| | | | | |
|---|---|---|---|---|
| 5,287,726 A | * | 2/1994 | Burritt | 73/37 |
| 5,331,747 A | * | 7/1994 | Stanton | 34/405 |
| 6,367,311 B1 | * | 4/2002 | Garg | 73/40.5 R |
| 2003/0213285 A1 | * | 11/2003 | Wheeler et al. | 73/40.5 R |

FOREIGN PATENT DOCUMENTS

EP  1 365 223 A2  11/2003

OTHER PUBLICATIONS

Search Report dated Mar. 15, 2006 for corresponding U.K. Patent Application No. GB0521895.3.

* cited by examiner

*Primary Examiner*—Charles Garber
(74) *Attorney, Agent, or Firm*—Nixon & Vanderhye P.C.

(57) ABSTRACT

An Advanced Data Logging kit for testing a generator's liquid cooled stator bar system for leaks is disclosed. The kit is installed in between the generator's header and the HIT Skid and in the generator's cooling system. The kit includes pressure and vacuum transducers, sensor arrays with thermocouples, and data acquisition circuits. The sensor arrays are used to plumb the thermocouples into the generator's header and cooling pipes. The pressure and vacuum transducers and the thermocouples are used to collect pressure, vacuum and temperature data that is used to conduct a Pressure Decay Test and a Vacuum Decay Test to determine whether or not a leak in the liquid cooled stator bar system exists. A computer included in the kit has the ability to analyze the data readings, perform calculations, and predict leak rates in the stator bar system.

39 Claims, 2 Drawing Sheets

ADVANCED HIT SKID DATA COLLECTION

The present invention relates to power generators, and, in particular, to a system for testing a generator's liquid cooled stator bar system for potential leaks that reduces the outage inspection cycle time for conducting such testing.

BACKGROUND OF THE INVENTION

Standard maintenance in power generators includes periodic testing of a generator's liquid cooled stator bar system for potential leaks. Typically, such testing is done using Hydraulic Integrity Test ("HIT") Skids. One of the tests performed with a HIT Skid is the Pressure Decay Test, which measures the pressure drop over time for a potentially leaking liquid cooled stator bar system. Currently, the Pressure-Decay Tests are performed over a 24 hour period, with hourly readings recorded manually. The manually recorded data points include internal generator pressure, atmospheric pressure, and multiple temperature readings. Other data collected during such testing includes volume measurements, which are often inaccurate because they do not account for the HIT Skid's internal plumbing, pressure tanks, valves and inter-connecting plumbing between the HIT Skid and generator. This testing inaccuracy directly affects the Pressure Decay Rate calculated from the Pressure Decay Test.

This testing inaccuracy also directly affects the calculated Vacuum Decay Rate that is measured in connection with a Vacuum Decay Test also performed by the HIT Skid for the purpose of locating potential leaks in a generator's liquid cooled stator bar system. Some of the difficulties with the Vacuum Decay Test are the requirement that a technician remain near the generator to record readings every 5 minutes for 75 minutes. The data in this test, like the Pressure-Decay Test, is manually recorded, which has inherent error. In addition, the sensor used with the Vacuum Decay Test is located on the HIT Skid, which is about 25 feet from the generator, adding to the potential error of the test. Once the manual data is collected, a post-process analysis is performed to determine the Pressure Decay Rate and the Vacuum Decay Rate to ascertain whether there is a leak in a liquid cooled stator bar system of the generator under test.

BRIEF DESCRIPTION OF THE INVENTION

The present invention is an Advanced Data Logging ("ADL") kit which is designed to be used with HIT Skids to test power generator liquid cooled stator bar systems for potential leaks. The ADL kit of the present invention includes pressure sensors, vacuum transducers, temperature sensors and data acquisition circuits that provide automatic data acquisition and increased accuracy of collected data. The present invention also includes analysis software for quickly and accurately analyzing collected data for the Pressure-Decay and Vacuum-Decay tests so that the data from such tests can be readily analyzed to determine the presence of any leaks in a liquid cooled stator bar system. The present invention uses sensor arrays to plumb temperature sensors into the existing lines between a generator's header connected to the stator bar system and the HIT Skid. The data collected by the temperature, pressure and vacuum sensors can be viewed either with an on-site computer including a circuit board with the data acquisition circuits and running the analysis software, or with another computer at a different location connected to the on-site computer via the internet or another kind of telecommunications connection.

DETAILED DESCRIPTION OF THE INVENTION

The present invention is an Advanced Data Logging kit for testing a generator's liquid cooled stator bar system for potential leaks. The kit is used with an HIT Skid to test a generator's liquid cooled stator bar system during an outage where the generator is drained of the coolant that usually runs through the generator's stator bar system and cooling pipes. The kit is connected to various inlet, outlet and drain fittings of the generator's header and cooling pipes. The kit monitors the temperature and pressure in the generator heading stator bar system and cooling pipes to determine the leak rate of same. To get more accurate measurements, the kit taps into the two top locations and two drain locations on opposite ends of the generator header. Because generators are fairly large units (some are as much as 15–20 feet long), there can be a significant temperature difference between one end versus the other end of the generator, which requires fairly accurate monitoring of the temperature and the pressure of a unit.

The Advanced Data Logging kit of the present invention is installed in between the inlet of the generator's header and the HIT Skid. The present invention includes pressure transducers, vacuum transducers, thermocouples, sensor arrays and data acquisition circuits. The sensor arrays are used to plumb thermocouples into the generator's header and cooling pipes. The pressure transducers and thermocouples are used to collect temperature and pressure data that is used to conduct a Pressure Decay Test. Vacuum transducers are used for a Vacuum Decay Test. Both tests are used to determine whether or not a leak in the liquid cooled stator bar system exists. By digitizing the data collection method, the present invention is able to record multiple data points concurrently. The computer included in the kit has the ability to analyze the data readings, self-generate plots, perform calculations, predict leak rates and transmit the collected data in several ways, including through standard USB connections, infrared connections, FM transmitter and Internet connections such as LAN, cable modems or satellite modems. The ADL kit also allows a technician to perform diagnostics of the ADL kit itself and troubleshoot potential setup problems.

Figure 1:
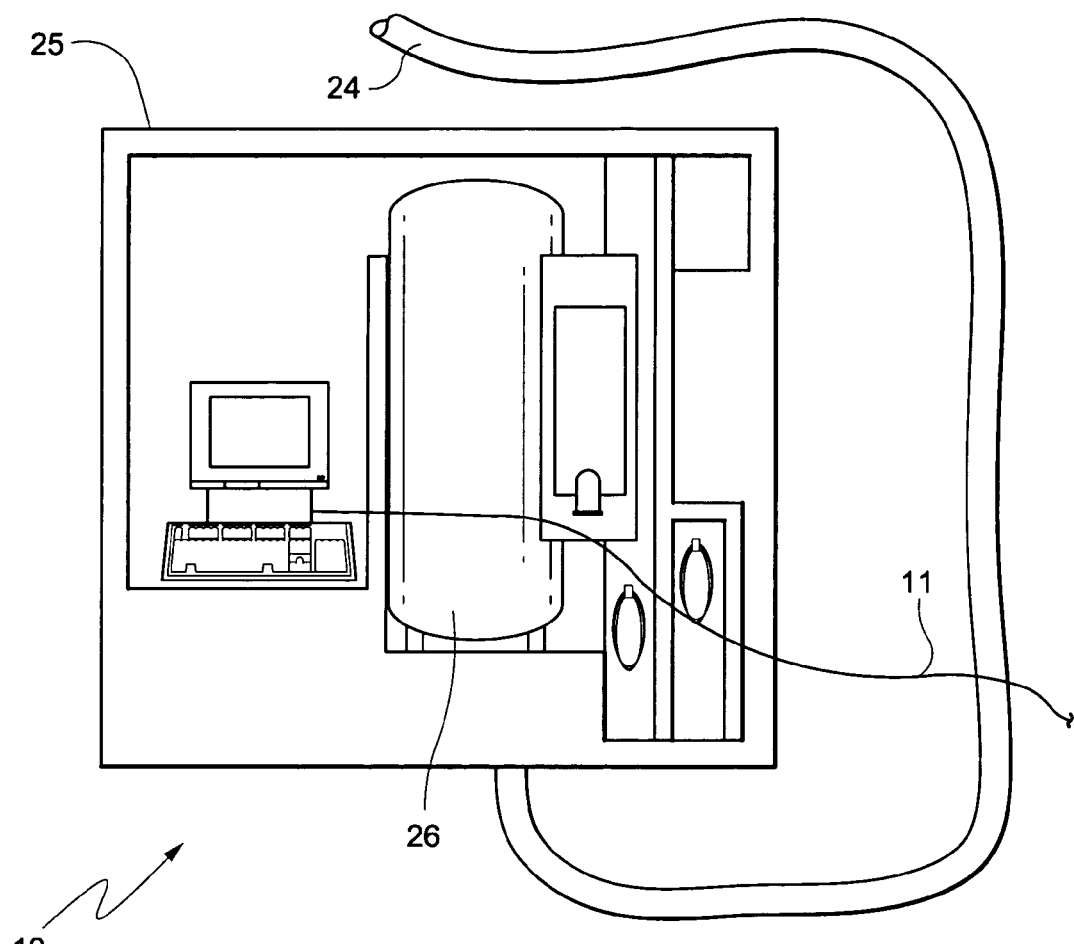
FIG. 1 is a sketch of a generator repair field station including a Hydraulic Integrity Test ("HIT") Skid used in the field testing of a generator's liquid cooled stator bar system to identify leaks in such system.
Figure 2:
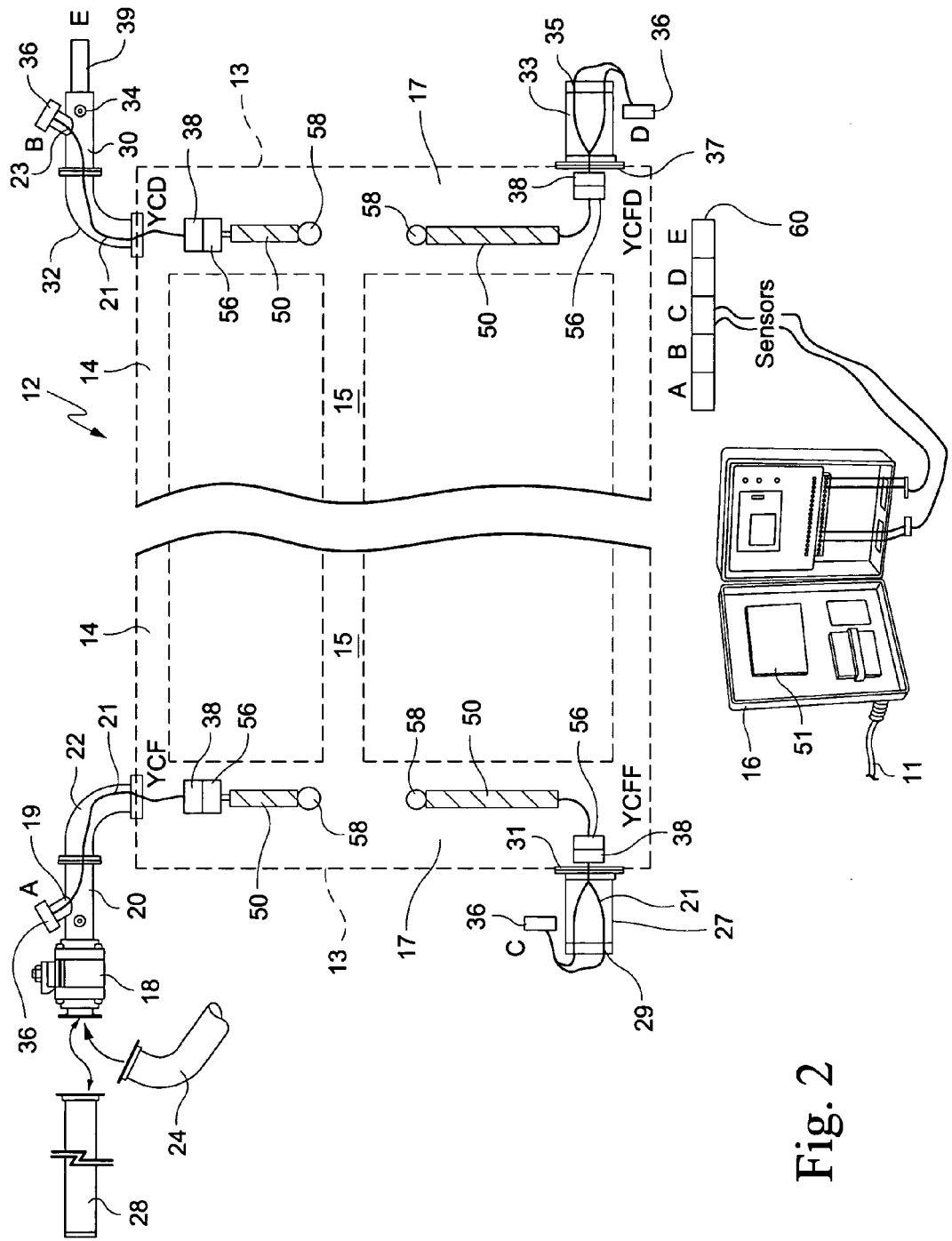
FIG. 2 is a schematic diagram of the components comprising the Advance Data Logging ("ADL") kit of the present invention.

FIG. 1 is a sketch 10 of a generator repair field station 25 including a Hydraulic Integrity Test ("HIT") Skid 26 used in the field testing of a generator's liquid cooled stator bar system to identify leaks in such system. FIG. 2 is a schematic diagram 12 of the components comprising the Advanced Data Logging ("ADL") kit of the present invention, which is used with HIT Skid 26 to test for leaks in a generator's liquid cooled stator bar system.

Referring to FIG. 2, there is shown in dashed lines a generator 13 including a header 14. Header 14 is connected to generator 13's stator bar system 15, which, in turn, is connected to cooling drain pipes 17. Within header 14 are openings which are generally designated in the industry with the nomenclatures "YCF", "YCD", "YCFD" and "YCFF". The YCF opening is the inlet to generator header 14, while the YCD opening is the outlet of header 14. The YCFF and YCFD openings are inlet and outlet drains for header 14 that are connected to header 14 by drain pipes 17 at opposite ends of generator 13.

Connected to the YCF opening by a quick connect fitting is a right angle tube 22. Preferably, the quick connect fitting is an A&N vacuum fitting (also called a QF fitting), which is part of the Quick Flange ("QF") Vacuum Connection System made by Scientific Instrument Services, Inc., located in Ringoes, N.J. It should be noted that other types of quick connect fittings could be used, besides the QF fittings made by SIS.

Connected to tube 22 by another quick connect fitting are a second tube 20 of a shutoff valve 18. Extending between an opening 19 in pipe 20 and a first end of pipe 22 joined to the YCF opening is a cable 21. Cable 21 includes a first connector 36 threaded in hole 19, sealed preferably by epoxy, and a second connector 38 free-floating within header 14.

Connected by a quick connect fitting to the YCD opening is a second right angle tube 32. Connected to tube 32 by yet another quick connect fitting is another tube 30 containing pressure transducers 34. Extending between an opening 23 in pipe 30 and a first end of pipe 32 joined to the YCD opening is a second cable 21, again including a first connector 36 threaded within hole 19, and sealed by epoxy, and a second connector 38 threaded free-floating within header 14.

Connected by a further quick connect fitting to the YCFF drain opening is a straight tube 27. Extending between a first opening 29 in pipe 27 outside of header 14 and a second opening 31 in pipe 27 inside of header 14 is a third cable 21, again including a first connector 36 outside of opening 29 and a second connector 38 free-floating within header 14, outside of opening 31.

Connected by yet another quick connect fitting to the YCFD drain opening is a second straight tube 33. Extending between a first opening 35 in pipe 33 outside of header 14 and a second opening 37 in pipe 33 inside of header 14 is a fourth cable 21, also including a first connector 36 outside of opening 35 and a second connector 38 free-floating within header 14, outside of opening 37.

Figure 3:
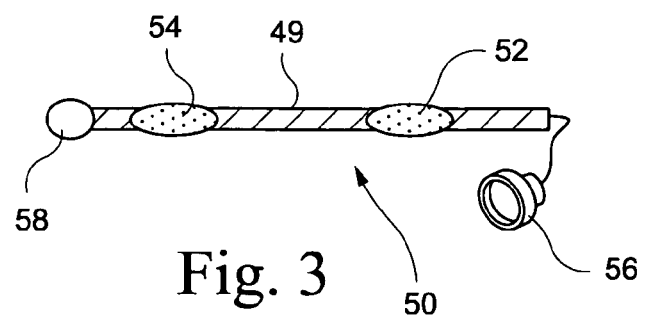
FIG. 3 is a sketch of a sensor array formed from a BX cable with a connector at one end and a steel ball at the other end that is used to plumb thermocouple temperature sensors into the header and cooling pipes of a power generator.

Referring now to FIG. 3, shown in that Figure is a sensor array 50, which is a BX cable 49 containing multiple thermocouple temperature sensors for measuring at various points temperatures within generator header 14 and cooling pipes 17. Sensor array 50 is depicted with two openings to show two redundant sets of three thermocouples located at positions 52 and 54 along BX cable 49. Each set of thermocouples is connected to a connector 56 which is joined to one of the connectors 38 within header 14 or pipes 17. It should be noted that connectors 38 and 56 are electrically and mechanically joined. Located at the opposite end from where connector 56 is attached to BX cable 49 is a metal ball end 58 that is used to prevent sensor array 50 from "hanging up" as it is plumbed within header 14 or pipes 17. Preferably, metal ball end 58 is steel, although other types of metal could be used. As depicted in FIG. 3, lower sensor arrays 50 are joined to connectors 38 by connectors 56, and inserted through drain pipes 27 and 33 to provide temperature measurements near the bottom and middle of generator 13's cooling pipes 17.

Upper sensor arrays 50 are connected to connectors 38 by connectors 50, and inserted through right angle pipes 22 and 32. Upper sensor arrays 50 are shorter than lower sensor arrays 50 inserted through drain pipes 27 and 33 because upper sensor arrays 50 provide only one temperature sensing zone near the top of header 14, while lower sensor arrays 50 in drain pipes 17 have two temperature sensing zones. Each of these temperature sensing zones includes a plurality of thermocouples.

Referring again to FIG. 2, each of the connectors 36 located outside of pipes 20, 30, 27 and 33 is, in turn, connected to one of a series of connectors 60 joined to a computer 16, which reads temperature data through acquisition circuits and stores the temperature data collected by the thermocouples in adaptor 50 within header 14 and pipes 17. Thus, connectors 36, designated as "A", "B", "C" and "D", are connected to corresponding connectors "A", "B", "C" and "D" in connector 60 joined to computer 16. Preferably, computer 16 is a GE Fanuc Static Computer that uses Windows 2000 as its operating system and that includes the typical components comprising a computer, including various standard interfaces, such as a USB cable for communicating with other devices, either locally or remotely.

It should be noted that computer 16 is merely exemplary of an appropriate data collection and processing device, which is within the scope of the present invention. It will be appreciated by those skilled in the art that the data collection and processing functions performed by computer 16 can also be implemented using a suitably programmed general-purpose computer, such as a microprocessor or micro-control, or other processor device, such as a CPU or MPU, in conjunction with one or more peripheral circuits for collecting data and communicating with other devices. The data collection and processing functions performed by computer 16 can also be implemented using a variety of separate dedicated or programmable integrated or other electronic circuits or devices, such as hardwired electronic or logic circuits including discrete element circuits or programmable logic devices, such as PLDs, PALs, PLAs or the like.

Referring now to FIG. 2, shutoff valve 18 includes a quick connect fitting by which a hose 24, also including a quick connect fitting, is connected to header 14 to pressurize header 14 after it has been drained of cooling fluid. Once header 14 has been pressurized by HIT skid 26 through hose 24, shutoff valve 18 is closed and hose 24 is removed and replaced by a hose 28 having a known volume that is used in the testing of header 14 and generator 13's stator bar system for potential leaks. Preferably, hose 14 has a known volume of one cubic foot, although other volumes could be used.

Pressure transducers 34 are connected to a connector 39 designated as "E" in FIG. 2. Connector 39, or "E", is, in turn, connected to corresponding connector "E" on connector 60 attached to computer 16 so as to allow computer 16 to read through pressure data its acquisition circuits and store the pressure data provided by pressure transducers 34.

Located within computer 16 is a circuit board containing the data acquisition circuits (not shown). These circuits include a series of analog to digital converters that convert the analog temperature data collected by the thermocouples in sensor arrays 50 and the pressure and vacuum data collected by pressure and vacuum transducers 34 into digital format so that the digital data can be read and processed by computer 16.

Computer 16 includes analysis software that logs the pressure, vacuum and temperature data collected by the pressure and vacuum transducers and thermocouples from header 14 and pipes 17. Using this data, along with analyses subroutines, computer 16 also computes leak rates for the generator's stator bar system to determine whether it has passed or failed the Hydraulic Integrity Test.

Data readings collected by computer 16 from the various temperature, pressure and vacuum sensors are logged in time intervals of approximately five seconds for a duration of up to 24 hours. For every time interval of data logging, computer 16's analysis program saves the file to internal storage media to prevent loss of cumulative data in the event of a power outage or disruption. All of the readings from the temperature sensors and the pressure and vacuum transducers are recorded to a data file for a spreadsheet export.

In computing leak rates, the calculations performed by computer 16 factor in sensor and hardware tolerances and linearity effects. Averaging is used by the analysis program to reduce effects of noise and smooth data trend lines in the collected data. Data points graphed by computer 16 are an average of three sensors at a given location, such as three thermocouples at the inlet YCF of header 14. If one of the redundant temperature sensors in a given location is defective, computer 16 is capable of detecting the defect and visually displaying the defect on a display 51 connected to computer 16.

In averaging temperature readings and negating bad temperature readings in a given location, the analysis program takes the median reading of the three redundant sensors and then adds approximately 5% to it and subtracts approximately 5% from it. If all of the sensors are substantially within this range, then the program averages their readings. If any sensor is out of range, then that sensor is not included in the average and a thermocouple zone chart is flagged from a normal color to red.

In averaging pressure readings and negating bad pressure readings, the analysis software again takes the median reading of the three redundant sensors, then adds approximately 5% to it and subtracts approximately 5% from it. Again, if all the sensors are substantially within this range, then the program averages their readings. If any sensor is out of range, that sensor is not included in the average and the pressure bar chart is flagged from a normal color to red.

To perform the Pressure Decay Test and the Vacuum Decay Test that are used to determine whether or not a leak in the liquid cooled stator bar system is present, the analysis software calculates the Pressure Decay Rate and the Vacuum Decay Rate for the generator header 14, stator bar system 15 and cooling pipes 17. For these purposes, the analysis software must first determine the volume of such generator components. To do so, the analysis software uses the following equation 1:

$$\text{Volume}_{(gen)} = \frac{\text{Volume}_{(1)} * \text{Pressure}_{(2)}}{\text{Pressure}_{(o)} - \text{Pressure}_{(2)}} \quad (1)$$

Where $\text{Volume}_{(1)}$ is the known volume; $\text{Pressure}_{(O)}$ is the pressure of the pressurized generator with shutoff valve 18 closed, prior to connection of the known volume 28. $\text{Pressure}_{(O)}$ is recorded after the system has reached stabilization in approximately 10 minutes; $\text{Pressure}_{(2)}$ is the pressure of the pressurized generator with shutoff valve 18 open after connection to the known volume 28. $\text{Pressure}_{(2)}$ is recorded after the system has reached stabilization in approximately 10 minutes.

To calculate the Pressure Decay Rate, the analysis software uses the following equation 2:

$$\text{PressureDecayRate}_{(air)} = \quad (2)$$
$$\frac{239.36 * \text{Volume}_{(gas)}}{\text{Time}_{(hrs)}} \times \left( \frac{\text{Abs.Pressure}_{(o)}}{\text{Abs.Temp}_{(o)}} - \frac{\text{Abs.Pressure}_{(2)}}{\text{Abs.Temp}_{(2)}} \right)$$

Where Decay Rate is ft³/day. Greater than at least one ft³/day is considered to be a failure; $\text{Time}_{(hrs)}$ is the time of the reading in hours; 1ˢᵗ Pressure Decay Rate shows on the chart after 1 hour, then it is updated per reading; Absolute Pressure$_{(0)}$ is the initial average Absolute pressure (inches of Hg) (NOTE: 2.036*psi=# inches of Hg. Ex. 1 psi–2.036 in Hg); Absolute Pressure$_{(2)}$ is the average Absolute pressure at time (hrs); Absolute Temperature$_{(o)}$ is the initial average Absolute Temperature of the 18 Thermocouples (K) (NOTE:
1. K=273.15+C
2. K=5/9F+255.3)

The test median that is used for the Pressure Decay Test is preferably either air or helium. The Pressure Decay Rate for helium can be compared to the Pressure Decay Rate for air by the following:

Pressure Decay Rate$_{(He)}$=0.385*Pressure Decay Rate$_{(air)}$

To calculate the Vacuum Decay Rate, the analysis software uses the following equation 3:

$$\text{Vacuum Decay Rate} = \frac{3.06 \times 10^{-4} * \text{Volume}_{(gen)} * \Delta \text{Pressure}}{\text{Time}_{(hrs)}}. \quad (3)$$

Where ΔPressure is the Pressure$_{(2)}$–Pressure$_{(0)}$.

Greater than at least 3 ft³/day is considered to be a failure

While the invention has been described in connection with what is presently considered to be the most practical and preferred embodiment, it is to be understood that the invention is not to be limited to the disclosed embodiment, but on the contrary, is intended to cover various modifications and equivalent arrangements included within the claims.

What is claimed is:

1. A test system for use with a hydraulic integrity test ("HIT") skid in testing a power generator's liquid cooled stator bar system for potential leaks, the test system comprising:
   a first pipe releasably connected to an inlet of the generator's cooling plumbing, the cooling plumbing being connected to the stator bar system,
   a second pipe releasably connected to an outlet of the generator's cooling plumbing, the second pipe containing a plurality of pressure and vacuum sensors,
   first and second drain pipes releasably connected to the generator's cooling plumbing,
   a plurality of temperature sensors inserted into the generator's cooling plumbing through the first, second and drain pipes, and
   a processing circuit coupled to said sensors for acquiring and analyzing pressure, vacuum and temperature data to determine whether the generator's stator bar system is leaking.

2. The test system of claim 1, wherein the processing circuit performs pressure decay and vacuum decay tests using said data collected by said pressure, vacuum and temperature sensors to determine whether the stator bar system is leaking.

3. The test system of claim 2, wherein the processing circuit is a computer which includes analysis software to perform the pressure decay and vacuum decay tests.

4. The test system of claim 3, wherein the computer includes a plurality of analog-to-digital converter circuits for converting data collected by the temperature, pressure and vacuum sensors into digital signals for analyzing by the computer.

5. The test system of claim 2, wherein the generator's cooling plumbing are drained of coolant prior to the pressure decay and vacuum decay tests being performed.

6. The test system of claim 2, further comprising a known volume attached to the first pipe, and wherein the analysis circuit uses the known volume in performing the pressure decay and vacuum decay tests to determine whether the stator bar system is leaking.

7. The test system of claim 6, wherein the known volume is attached to the first pipe after the generator's cooling plumbing have been pressurized by the HIT skid.

8. The test system of claim 1, further comprising sensor arrays containing the temperature sensors for facilitating the insertion of the temperature sensors into the generator's cooling plumbing.

9. The test system of claim 8, wherein each of the sensor arrays is comprised of a BX cable having a plurality of thermocouples inserted therein for sensing temperature.

10. The test system of claim 9, wherein each of the sensor arrays further comprises a connector attached at one end of the BX cable and a metal ball attached at the other end of the BX cable.

11. The test system of claim 8, wherein the sensor arrays include upper sensor arrays inserted into the top of the cooling plumbing providing only one temperature sensing zone, and lower sensor arrays inserted into the drain pipes providing two temperature sensing zones.

12. The test system of claim 11, wherein each of the temperature sensing zones is comprised of a plurality of thermocouples.

13. The test system of claim 1, wherein the first pipe is releasably connected to the HIT skid and the generator's cooling plumbing and the second pipe and drain pipes are releasably connected to the generator's cooling plumbing using quick connect fittings.

14. The test system of claim 13, wherein the quick connect fittings are quick flange vacuum fittings.

15. The test system of claim 14, wherein each of the sensor arrays is comprised of a BX cable having a plurality of thermocouples inserted therein for sensing temperature.

16. The test system of claim 15, wherein each of the sensor arrays further comprises a connector attached at one end of the BX cable and a metal ball attached at the other end of the BX cable.

17. The test system of claim 1, wherein the first and second pipes are connected to openings in the generator's cooling plumbing designated "YCF" and "YCD", respectively, and wherein the drain pipes are connected to openings in the generator's cooling plumbing designated "YCFF" and "YCFD".

18. The test system of claim 1, wherein the temperature, pressure and vacuum sensors are connected to the processing circuit through cables having connectors secured within the first, second and drain pipes and within the generator's cooling plumbing by threading and epoxy.

19. The test system of claim 1, wherein the temperature, pressure and vacuum sensors provide temperature, pressure and vacuum data, respectively, that are each used by the computer as an average of said data collected from a plurality of readings from said sensors.

20. The test system of claim 1, wherein the processing circuit determines whether any sensor is providing data outside of a predetermined data reading, and if it is, the circuit indicates the sensor as being defective.

21. A test system for use with a hydraulic integrity test ("HIT") skid in testing a power generator's liquid cooled stator bar system for potential leaks, the system comprising:
    a first plurality of temperature sensors inserted into an inlet of a header of the generator's cooling plumbing through a first pipe releasably connected between the inlet and the HIT skid, the header being connected to the stator bar system,
    a second plurality of temperature sensors inserted into an outlet of the header through a second pipe releasably connected to the outlet,
    a plurality of pressure and vacuum sensors connected to the outlet of the header through the second pipe attached to the outlet,
    a third plurality of temperature sensors inserted into a first drain pipe for said header's input,
    a fourth plurality of temperature sensors inserted into a second drain pipe for said header's output, and
    a computer coupled to said sensors for acquiring and analyzing temperature, pressure and vacuum data collected by said sensors to determine whether the stator bar system is leaking.

22. The test system of claim 21, wherein the computer performs pressure decay and vacuum decay tests using the data collected by the pressure, vacuum and temperature sensors to determine whether the generator's stator bar system is leaking.

23. The test system of claim 22, wherein the computer includes analysis software to perform the pressure decay and vacuum decay tests.

24. The test system of claim 22, wherein the generator's cooling pipes are drained of coolant prior to the pressure decay and vacuum decay tests being performed.

25. The test system of claim 22, wherein the computer uses a known volume attached to the header input through the first pipe in performing the pressure decay and vacuum decay tests to determine whether the stator bar system is leaking.

26. The test system of claim 25, wherein the known volume is attached to the input of the generator's heading after the header, stator bar system and cooling plumbing have been pressurized by the HIT skid.

27. The test system of claim 25, wherein the known volume is one cubic foot.

28. The test system of claim 22, wherein a pressure decay rate greater than approximately 1 $ft^3$/day is indicated by the computer as a failure of the pressure decay test.

29. The test system of claim 22, wherein a vacuum decay rate greater than approximately 3 $ft^3$/day is indicated by the computer as a failure of the vacuum decay test.

30. The test system of claim 21, further comprising a plurality of sensor arrays containing the temperature sensors for inserting said sensors into the generator's header and cooling plumbing.

31. The test system of claim 30, wherein the sensor arrays include upper sensor arrays inserted into the top of the header providing only one temperature sensing zone, and lower sensor arrays inserted into the drain pipes providing two temperature sensing zones.

32. The test system of claim 31, wherein each of the temperature sensing zones is comprised of a plurality of thermocouples.

33. The test system of claim 21, wherein the first, second and drain pipes are connected to the HIT skid, the generator's heading and/or cooling plumbing using quick connect fittings.

34. The test system of claim 33, wherein the quick connect fittings are quick flange vacuum fittings.

35. The test system of claim 21, wherein the computer includes a plurality of analog-to-digital converter circuits for converting the data collected by the temperature, pressure and vacuum sensors into digital signals for analyzing by the computer.

36. The test system of claim 21, wherein the first and second pipes are connected to openings in the generator's heading designated "YCF" and "YCD", respectively, and wherein the drain pipes are connected to the openings in the generator's cooling pipes designated "YCFF" and "YCFD", respectively.

37. The test system of claim 21, wherein the temperature, pressure and vacuum sensors are connected to the computer through cables having connectors secured within the first, second and drain pipes and the generator's header and cooling pipes by threading and epoxy.

38. The test system of claim 21, wherein each of the temperature, pressure and vacuum sensors provide temperature and pressure, and vacuum data, respectively, that is used by the computer as an average of a plurality of readings from said sensor.

39. The test system of claim 38, wherein the computer determines whether any sensor is outside of a predetermined data reading, and if it is, the computer indicates the sensor as being defective.

* * * * *

UNITED STATES PATENT AND TRADEMARK OFFICE
CERTIFICATE OF CORRECTION

PATENT NO. : 7,194,894 B2
APPLICATION NO. : 10/980796
DATED : March 27, 2007
INVENTOR(S) : Mall et al.

Page 1 of 1

It is certified that error appears in the above-identified patent and that said Letters Patent is hereby corrected as shown below:

In column 6 at line 43 before the word "claims" insert the phrase --spirit and scope of the appended--

Signed and Sealed this

Twentieth Day of November, 2007

JON W. DUDAS
*Director of the United States Patent and Trademark Office*